(12) United States Patent
O'Hara

(10) Patent No.: US 7,399,549 B2
(45) Date of Patent: Jul. 15, 2008

(54) ALTERING ZETA POTENTIAL OF DISPERSIONS FOR BETTER HCD PERFORMANCE AND DISPERSION STABILITY

(75) Inventor: Jeanette E. O'Hara, Honeoye, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 375 days.

(21) Appl. No.: 11/112,148

(22) Filed: Apr. 22, 2005

(65) Prior Publication Data

US 2006/0237693 A1 Oct. 26, 2006

(51) Int. Cl.
*H01M 4/00* (2006.01)
*H01B 1/24* (2006.01)

(52) U.S. Cl. .................. 429/44; 252/511; 428/304.4

(58) Field of Classification Search .............. 252/510, 252/511; 428/304.5, 317.9, 304.4, 421; 429/126, 429/248, 249, 254, 44, 421
See application file for complete search history.

(56) References Cited

U.S. PATENT DOCUMENTS

| | | | |
|---|---|---|---|
| 3,985,578 | A | 10/1976 | Witherspoon et al. |
| 5,019,308 | A * | 5/1991 | Pratt et al. .................. 264/87 |
| 5,272,017 | A | 12/1993 | Swathirajan et al. |
| 5,624,769 | A | 4/1997 | Li et al. |
| 5,776,624 | A | 7/1998 | Neutzler |
| 6,277,513 | B1 | 8/2001 | Swathirajan et al. |
| 6,350,539 | B1 | 2/2002 | Wood, III et al. |
| 6,372,376 | B1 | 4/2002 | Fronk et al. |
| 6,521,381 | B1 | 2/2003 | Vyas et al. |
| 6,524,736 | B1 | 2/2003 | Sompalli et al. |
| 6,566,004 | B1 | 5/2003 | Fly et al. |
| 6,663,994 | B1 | 12/2003 | Fly et al. |
| 6,793,544 | B2 | 9/2004 | Brady et al. |
| 6,794,068 | B2 | 9/2004 | Rapaport et al. |
| 6,811,918 | B2 | 11/2004 | Blunk et al. |
| 6,824,909 | B2 | 11/2004 | Mathias et al. |
| 2005/0026012 | A1 | 2/2005 | O'Hara |
| 2005/0026018 | A1 | 2/2005 | O'Hara et al. |
| 2005/0026523 | A1 | 2/2005 | O'Hara et al. |

(Continued)

FOREIGN PATENT DOCUMENTS

JP 58-166648 * 10/1983

(Continued)

OTHER PUBLICATIONS

Itescu "Polymer Electrolyte Fuel Cells: the gas diffusion layer", Princeton University PRISM REU Nov. 2004 (pp. 1-15).*

(Continued)

*Primary Examiner*—Mark Kopec

(57) ABSTRACT

Ink dispersions for use in fuel cells, comprising a mixture of: (1) a carbon-containing material, such as carbon black; and (2) a base or acid operable to adjust the pH of the ink dispersion, wherein the pH of the mixture has a zeta potential as close to lying outside the +/−30 mV range of the point of zero charge. The mixtures can also include a fluoropolymer, at least one alcohol, and water. The ink dispersions can be used in conjunction with the gas diffusion media components of the fuel cell, including proton exchange membrane fuel cells. The ink dispersions are very stable and can be used in conjunction with high current density applications.

17 Claims, 4 Drawing Sheets

U.S. PATENT DOCUMENTS

2005/0233203 A1* 10/2005 Hampden-Smith et al. .... 429/44
2006/0105159 A1*  5/2006 O'Hara et al. ........... 428/318.6
2006/0222840 A1* 10/2006 Frisk et al. ............... 428/319.3

FOREIGN PATENT DOCUMENTS

JP            41-0135083     *   5/1998

OTHER PUBLICATIONS

Park et al "Effect of carbon loading in microporous layer on PEM fule cell performance", Journal of Powder Sources 163(2006) 357-363.*

Kong et al "Influence of pore-size distribution of the diffusion layer on mass-transport problems of proton exchange membrane fuel cells", Journal of Power Sources 108(2002) 185-191.*

Lin et al "Performance Analysis of a Proton-Exchange Membrane Fuel Cell . . . ", Energy & Fuels, Web Release Date Feb. 14, 2008.*

* cited by examiner

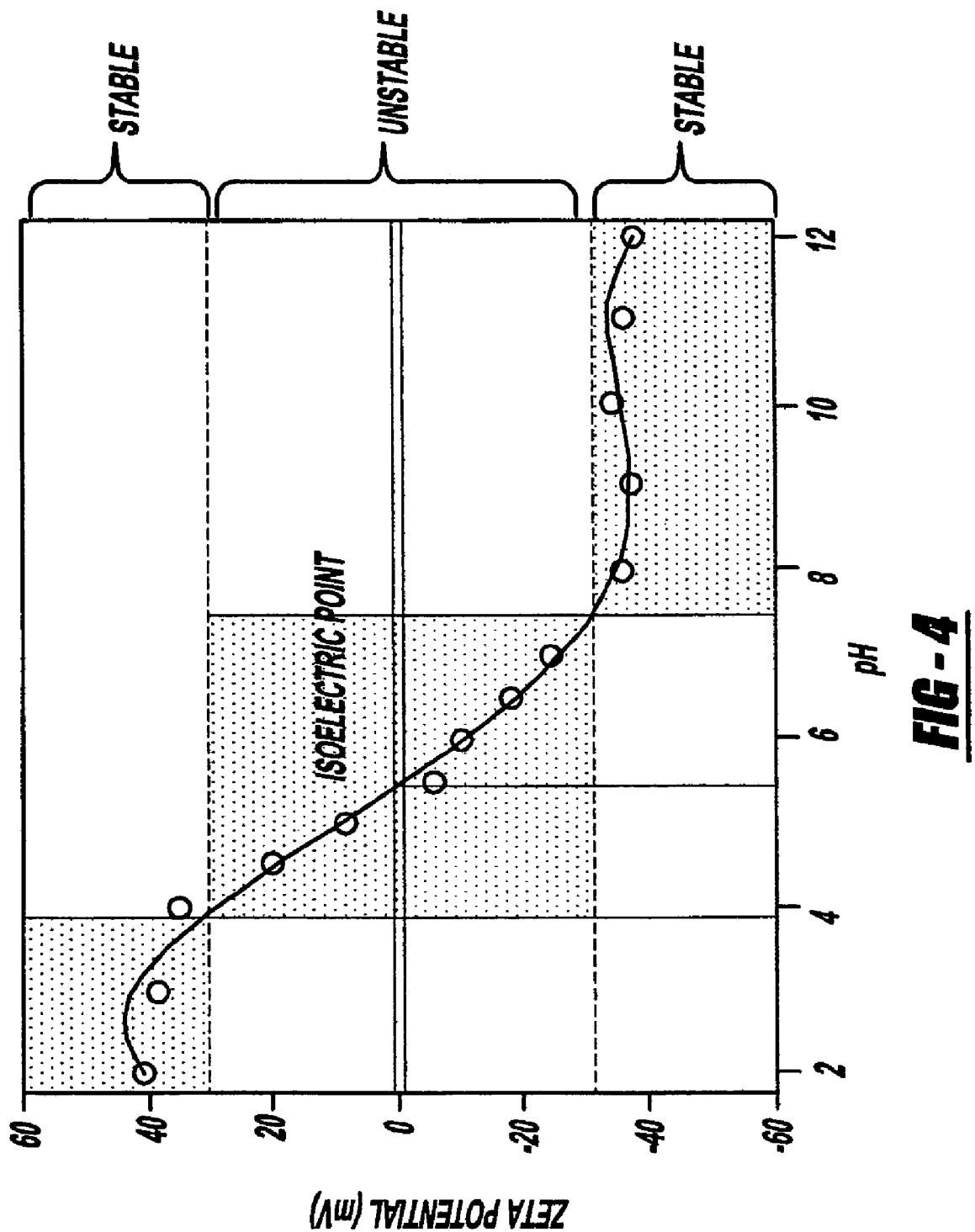

ALTERING ZETA POTENTIAL OF DISPERSIONS FOR BETTER HCD PERFORMANCE AND DISPERSION STABILITY

BACKGROUND OF THE INVENTION

1. Field of the Invention

The present invention relates generally to fuel cell systems, and more particularly to a new and improved ink compositions for gas diffusion media components of Proton Exchange Membrane (PEM) fuel cell systems.

2. Discussion of the Related Art

Fuel cells have been used as a power source in many applications. For example, fuel cells have been proposed for use in electrical vehicular power plants to replace internal combustion engines. In PEM-type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements, sometimes referred to as the gas diffusion media components, that: (1) serve as current collectors for the anode and cathode; (2) contain appropriate openings therein for distributing the fuel cell's gaseous reactants over the surfaces of the respective anode and cathode catalysts; (3) remove product water vapor or liquid water from electrode to flow field channels; (4) are thermally conductive for heat rejection; and (5) have mechanical strength. The term fuel cell is typically used to refer to either a single cell or a plurality of cells (e.g., a stack) depending on the context. A plurality of individual cells are commonly bundled together to form a fuel cell stack and are commonly arranged in series. Each cell within the stack comprises the MEA described earlier, and each such MEA provides its increment of voltage.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

Examples of technology related to PEM and other related types of fuel cell systems can be found with reference to commonly-assigned U.S. Pat. No. 3,985,578 to Witherspoon et al.; U.S. Pat. No. 5,272,017 to Swathirajan et al.; U.S. Pat. No. 5,624,769 to Li et al.; U.S. Pat. No. 5,776,624 to Neutzler; U.S. Pat. No. 6,277,513 to Swathirajan et al.; U.S. Pat. No. 6,350,539 to Woods, III et al.; U.S. Pat. No. 6,372,376 to Fronk et al.; U.S. Pat. No. 6,521,381 to Vyas et al.; U.S. Pat. No. 6,524,736 to Sompalli et al.; U.S. Pat. No. 6,566,004 to Fly et al.; U.S. Pat. No. 6,663,994 to Fly et al.; U.S. Pat. No. 6,793,544 to Brady et al.; U.S. Pat. No. 6,794,068 to Rapaport et al.; U.S. Pat. No. 6,811,918 to Blunk et al.; U.S. Pat. No. 6,824,909 to Mathias et al.; U.S. Patent Application Publication Nos. 2005/0026012 to O'Hara; 2005/0026018 to O'Hara et al.; and 2005/0026523 to O'Hara et al., the entire specifications of all of which are expressly incorporated herein by reference.

The gas diffusion media component of a PEM fuel cell is typically comprised of a non-woven carbon fiber paper, e.g., those available from Toray Industries, Inc. (Tokyo, Japan), or a woven carbon cloth, e.g., those available from Zoltek Corporation (St. Louis, Mo.) under the PANEX trade name. Upon arrival at the PEM fuel cell manufacturer, the as-is product is typically post treated in order to render the material hydrophobic. Additionally, it has become more common practice to apply a microlayer ink (sometimes referred to as a microporous layer (MPL)) to the gas diffusion layer (GDL) for more effective water management properties.

A typical microlayer ink generally includes a carbon black powder and a fluorinated polymer dispersion (typically PTFE) that is contained in a solvent system. Historically, stabilizing carbon black powder in dispersions has been a challenge to ink specialists in numerous industries, including those involved with the production of PEM fuel cells. For a PEM fuel cell application, choosing the correct carbon black and polymer for optimal performance is another complexity. As such, current approaches of forming stable microlayer ink compositions, especially for use in conjunction with high current density (HCD) applications, are extremely difficult and have not resulted in completely satisfactory results.

Accordingly, there exists a need for new and improved ink compositions for gas diffusion media components of PEM fuel cell systems, especially those that are both stable and perform satisfactorily in conjunction with HCD applications.

SUMMARY OF THE INVENTION

In accordance with the general teachings of the present invention, new and improved ink compositions for gas diffusion media components of PEM fuel cell systems, especially those that are both stable and perform satisfactorily in conjunction with HCD applications, are provided.

In accordance with one embodiment of the present invention, an ink dispersion for use in fuel cells is provided, comprising a mixture of: (1) a carbon-containing material; and (2) a base or acid operable to adjust the pH of the ink dispersion; wherein the pH of the mixture has a zeta potential lying outside the +/−30 mV range of the point of zero charge.

In accordance with a first alternative embodiment of the present invention, an ink dispersion for use in fuel cells is provided, comprising a mixture of: (1) a carbon-containing material; (2) a base or acid operable to adjust the pH of the ink dispersion; and (3) a fluoropolymer; wherein the pH of the mixture has a zeta potential lying outside the +/−30 mV range of the point of zero charge.

In accordance with a second alternative embodiment of the present invention, an ink dispersion for use in fuel cells is provided, comprising a mixture of: (1) a carbon-containing material; (2) a base or acid operable to adjust the pH of the ink dispersion; and (3) a fluoropolymer, wherein the pH of the mixture has a zeta potential as close to lying outside the +/−30 mV range of the point of zero charge, wherein the pH of the mixture is in the range of about 2 to about 4 or about 8 to about 12.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a graphical illustration of zeta potential versus pH characteristics of an ideally stable ink dispersion, in accordance with the general teachings of the present invention.

DETAILED DESCRIPTION OF THE EMBODIMENTS

Figure 1:
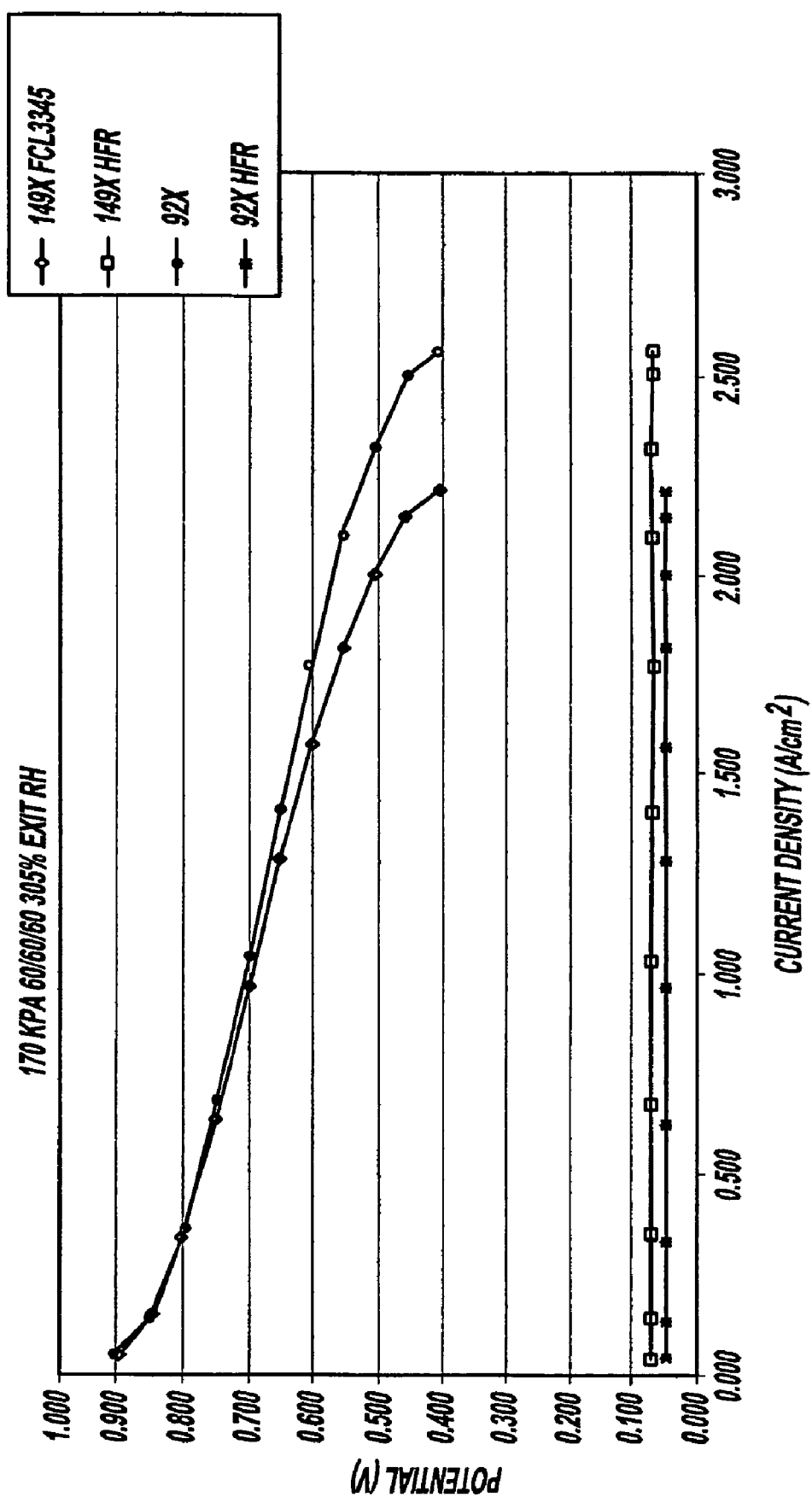
FIG. 1 is a graphical illustration of voltage versus current density characteristics of two pH-adjusted ink dispersion samples of the present invention.

The following description of the preferred is merely exemplary in nature and is in no way intended to limit the invention, its application, or uses.

In accordance with the general teachings of the present invention, a formulation and process is provided for stabilizing the microlayer ink dispersion. This stabilization has a significant impact on the performance of the GDL in PEM fuel cells.

One key property of ink-formulations is the stability of the dispersion. This property may be characterized in different ways: (1) separation of components into different layers; (2) coagulation of particles; (3) sedimentation of solids; and/or the like. A test that is aimed at determining dispersion stability is generally referred to as the zeta potential measurement. In a dispersion, it is known that colloidal particles with charged surfaces have equal but oppositely charged species present in the solution. These oppositely charged species surround the colloidal particle and move with the particle through the solution. This is known as the double layer. There is another layer of charged species present, next to the oppositely charged species that is present in solution but will not move with the original colloidal particle through the dispersion. This layer is termed the Stern Layer and is located at the shear plane (i.e., the location from the particle which does not move with the colloidal particle through the solution). The potential at this location is useful in determining dispersion stability as it is an indicator of how many "like" charged-particles are in solution. Because oppositely charged particles attract, large quantities of oppositely charged particles will tend to coagulate or flocculate a system. The more like-charged particles present, the less likely the dispersion is to coagulate, thus resulting in more stability.

Dispersions have a characteristic zeta potential, i.e., the voltage measured at the Stern Plane. The zeta potential is a function of the pH of a solution, as adding acidic or basic species can introduce more negative or positive species, thus stabilizing or destabilizing the dispersion. By adjusting the pH of the dispersion, one can alter the zeta potential and can render it more stable. As the pH is changed, the zeta potential can go through a 0 point, called the isoelectric point, or point of zero charge (pzc). This zeta potential is very unstable as the charges are effectively neutralized. The system becomes more dispersionally stable as is the zeta potential moves closer to +/−30 mV of the isoelectric point in aqueous solutions. Zeta potentials can be anywhere from +/−100 mV, and the larger the value, the more stable the dispersion.

Carbon black has many negatively charged surface groups present. When introduced into an aqueous solution, this can be characterized by a pH of about 4 and a pzc of about 3. This formulation, although unstable from a colloidal point of view, will provide optimal fuel cell performance. However, if one introduces more negatively charged ions (e.g., by adding base), thus stabilizing the dispersion, it has been shown that the zeta potential shifts into a more stable region and fuel cell performance increases, evidenced by a higher voltage at relatively high current densities.

The present invention has developed such stable dispersions that are suitable for use with fuel cells, especially those used in applications involving relatively high current densities. By way of a non-limiting example, this was accomplished by adding base in different quantities, measuring pH before MPL coating, and testing the resulting MPL in 50 cm² hardware.

An illustrative dispersion, in accordance with one aspect of the present invention, was formed in the following manner, as set forth in the Example, below:

EXAMPLE

To a 125 ml bottle, 2.4 g acetylene black carbon, 32 ml isopropyl alcohol, 37 ml de-ionized $H_2O$, and 0.2 g ammonium carbonate (($NH4)_2CO_3$) was added. Ceramic beads were then added to fill one third of the bottle volume, and the dispersion was ball-milled at 120 rpm for 21 hours. Upon removal, the pH was measured to be 8.82. Polytetrafluoroethylene (PTFE) in the form of DuPont T-30 solution was added in the amount of 1.33 g, and the, dispersion was shaken by hand and coated on a T060 paper, sintered and tested.

Referring to FIG. 1, there is shown a graphical illustration of voltage versus current density characteristics of two pH-adjusted ink dispersion samples of the present invention. FIG. 1, in particular, illustrates the comparison of pH adjustment of the samples during the milling process.

The carbon can be comprised of any number of materials, including but not limited to carbon black such as VULCAN XC-72 (Cabot Corp., Alpharetta, Ga.), Black Pearls, Ketjen Black, graphite particles, graphite flakes, carbon nanofibers, carbon nanotubes, and/or the like. The polymeric material can be comprised of any number of materials, including but not limited to fluoropolymers such as but not limited to polyvinylidene fluoride (PVDF), hexafluoropropylene (HFP), polymers of tetrafluoroethylene and hexafloropropylene (FEP), and/or the like. The pH adjuster can be comprised of any number of materials, including but not limited to any suitable base that will not poison the MEA upon integration into the PEM fuel cell.

Figure 2:
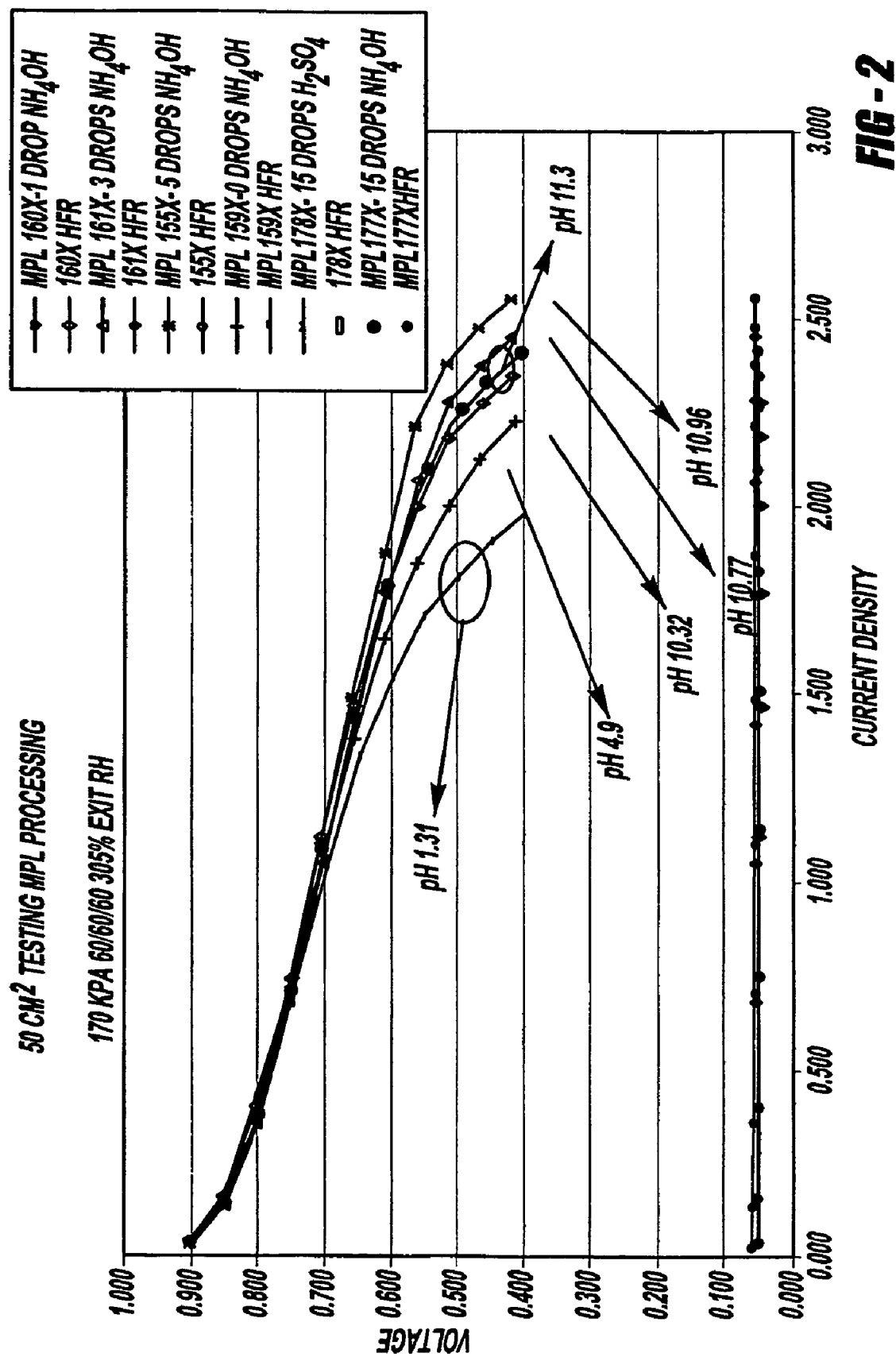
FIG. 2 is a graphical illustration of voltage versus current density characteristics of several ammonium hydroxide pH-adjusted ink dispersion samples of the present invention.

A second sample was prepared in accordance with the Example set forth above, but without the ammonium carbonate. The pH of this sample before addition of the PTFE was measured to be 4.9. The data points for the same can be seen plotted in FIG. 2. As FIG. 2 illustrates, the dispersion samples are very stable and appear to exhibit favorable high current density characteristics.

To confirm this, the formulation of the first sample prepared in accordance with the Example set forth above was mimicked, except that was substituted in various quantities for the ammonium carbonate to show a pH trend with performance. The pH values of the dispersion samples are set forth in Table I, below:

TABLE I

| Drops of ammonium hydroxide (NH$_4$OH) | pH after milling |
|---|---|
| 0 | 4.9 |
| 1 | 10.32 |
| 3 | 10.77 |
| 5 | 10.96 |
| 15 | 11.3 |

In order to confirm dispersion instability, the a dispersion sample was adjusted with an acid, i.e., Sulfuric acid (H$_2$SO$_4$), the pH value for the same set forth in Table II, below:

TABLE II

| Drops of sulfuric acid (H$_2$SO$_4$) | pH after milling |
|---|---|
| 15 | 1.31 |

The data points for the various dispersion samples described above can be seen plotted in FIG. 2. As FIG. 2 illustrates, as pH is increased in the samples, it does aid in the high current density performance or mass transport limited region of the polarization curve. However, as pH is further increased, those samples exhibit relatively poor high current density performance (e.g., see the plot for the 11.3 pH dispersion). Likewise, as the pH is further decreased, those samples exhibit equally poor high current density performance (e.g., see the plot for the 1.31 pH dispersion). Thus, these results indicate that the pH range of the dispersions of the present invention should be kept in the range as set forth herein.

Figure 3:
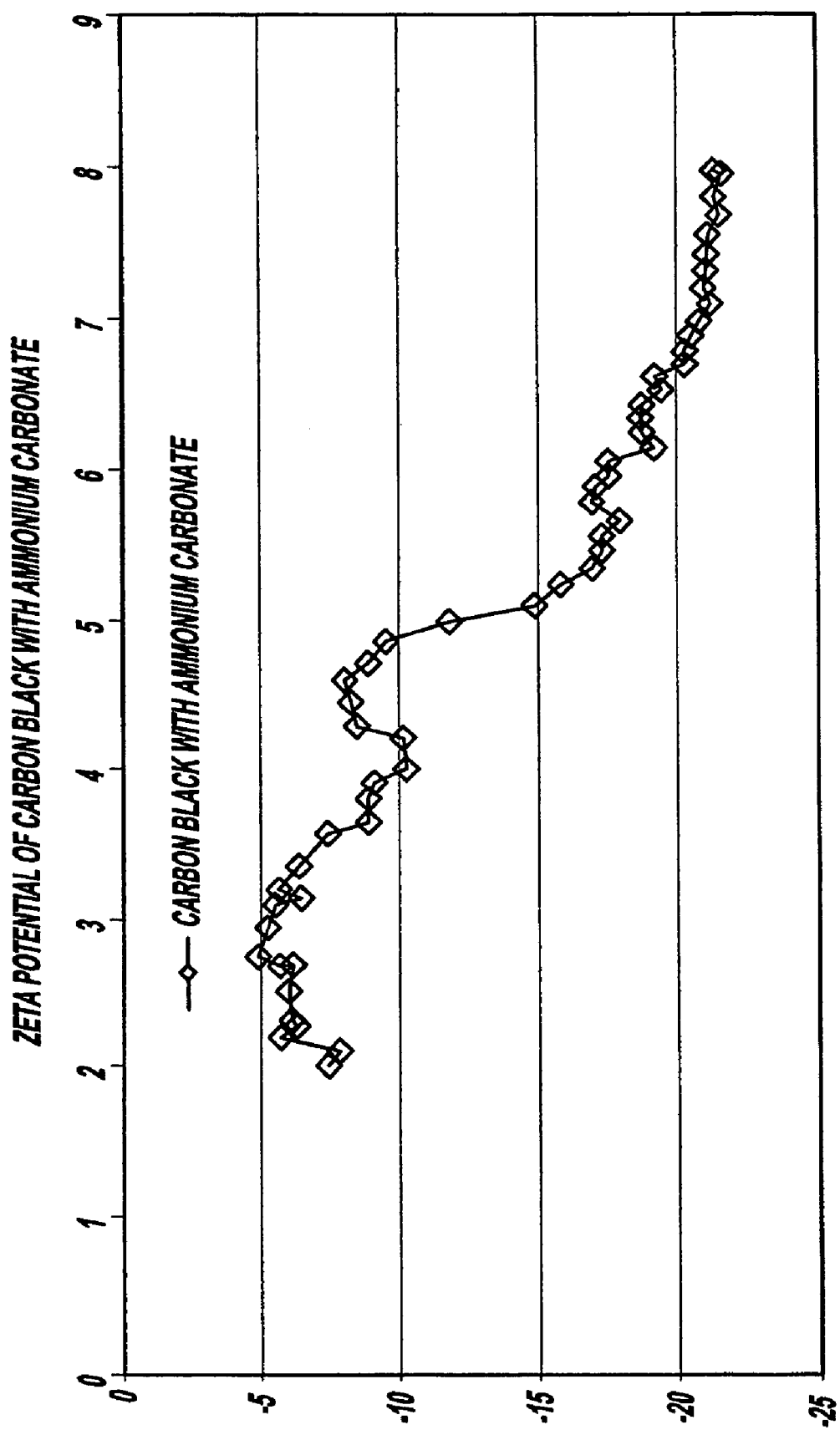
FIG. 3 is a graphical illustration of zeta potential versus pH characteristics of a first illustrative pH-adjusted ink dispersion sample of the present invention.

To determine the zeta potential and pH characteristics of the carbon black and ammonium carbonate ((NH4)$_2$CO$_3$) mixtures of the dispersions prepared in accordance with the Example set forth above, a plot was prepared, as shown in FIG. 3. Samples prepared without the pH adjustment could not be measured in a similar manner as the dispersion was so unstable.

As FIG. 4 illustrates, ideal zeta potential-pH characteristics lie outside the +/−30 mV range of the pzc, in accordance with the general teachings of the present invention. The ink dispersions having these particular zeta potential characteristics generally have pH levels in the range of about 2 to about 4 and about 8 to about 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An ink dispersion for use in fuel cells, said ink dispersion being a layer on a gas diffusion media in the fuel cells, said fuel cells including an electrode having a catalyst positioned adjacent to the gas diffusion media, said ink dispersion comprising a mixture of:
   a carbon-containing material; and
   a base or acid operable to adjust the pH of the ink dispersion;
   wherein the pH of the mixture has a zeta potential lying outside the +/−30 mV range of the point of zero charge.

2. The invention according to claim 1, wherein the pH of the mixture has a zeta potential as close to lying outside the +/−30 mV range of the point of zero charge.

3. The invention according to claim 1, wherein the mixture has a pH about 8 or greater at about −30 mV or greater of the point of zero charge of the zeta potential of the ink dispersion.

4. The invention according to claim 1, wherein the mixture has a pH in the range of about 8 to about 12 at about −30 mV or greater of the point of zero charge of the zeta potential of the ink dispersion.

5. The invention according to claim 1, wherein the mixture has a pH in the range of about 2 to about 4 at about +30 mV or greater of the point of zero charge of the zeta potential of the ink dispersion.

6. The invention according to claim 1, wherein the carbon-containing material comprises a material selected from the group consisting of carbon black, graphite particles, graphite flakes, carbon nanofibers, carbon nanotubes, and combinations thereof.

7. The invention according to claim 1, wherein the fuel cell is the proton exchange membrane type.

8. The invention according to claim 1, wherein the base or acid is selected from the group consisting of ammonium carbonate, ammonium hydroxide, sulfuric acid, and combinations thereof.

9. An ink dispersion for use in fuel cells is provided, said ink dispersion being a layer on a gas diffusion media in the fuel cells, said fuel cells including an electrode having a catalyst positioned adjacent to the gas diffusion media, said ink dispersion comprising a mixture of:
   a carbon-containing material;
   a base or acid operable to adjust the pH of the ink dispersion; and
   a fluoropolymer;
   wherein the pH of the mixture has a zeta potential lying outside the +/−30 mV range of the point of zero charge.

10. The invention according to claim 9, wherein the pH of the mixture has a zeta potential as close to lying outside the +/−30 mV range of the point of zero charge.

11. The invention according to claim 9, wherein the mixture has a pH in the range of about 8 to about 12 at about −30 mV or greater of the point of zero charge of the zeta potential of the ink dispersion.

12. The invention according to claim 9, wherein the mixture has a pH in the range of about 2 to about 4 at about +30 mV or greater of the point of zero charge of the zeta potential of the ink dispersion.

13. The invention according to claim 9, wherein the fluoropolymer is selected from the group consisting of polytetrafluoroethylene, polyvinylidene fluoride, hexafluoropropylene, polymers of tetrafluoroethylene and hexafloropropylene (FEP), and combinations thereof.

14. The invention according to claim 9, wherein the carbon-containing material comprises a material selected from the group consisting of carbon black, graphite particles, graphite flakes, carbon nanofibers, carbon nanotubes, and combinations thereof.

15. The invention according to claim 9, wherein the base or acid is selected from the group consisting of ammonium carbonate, ammonium hydroxide, sulfuric acid, and combinations thereof.

16. The invention according to claim 9, wherein the fuel cell is the proton exchange membrane type.

17. An ink dispersion for use in fuel cells, said ink dispersion being a layer on a gas diffusion media in the fuel cells, said fuel cells including an electrode having a catalyst positioned adjacent to the gas diffusion media, said ink dispersion comprising a mixture of:

a carbon-containing material;
a base or acid operable to adjust the pH of the ink dispersion; and
a fluoropolymer;
wherein the pH of the mixture has a zeta potential as close to lying outside the +/−30 mV range of the point of zero charge;
wherein the pH of the mixture is in the range of about 2 to about 4 or about 8 to about 12.

* * * * *